United States Patent [19]

Sattman

[11] Patent Number: 4,843,722
[45] Date of Patent: Jul. 4, 1989

[54] SELF-CENTERING BORE HOLE GAGE

[76] Inventor: Karl Sattman, 941 Viewland, Rochester Hills, Mich. 48064

[21] Appl. No.: 120,112

[22] Filed: Nov. 13, 1987

[51] Int. Cl.⁴ .............................................. G01B 5/00
[52] U.S. Cl. ................................... 33/178 E; 33/544; 33/501.2
[58] Field of Search ............ 33/178 R, 178 E, 178 F, 33/147 K, 542, 543, 544

[56] References Cited

U.S. PATENT DOCUMENTS

| | | | |
|---|---|---|---|
| 2,239,981 | 4/1941 | Terry et al. | 33/178 E |
| 2,369,909 | 2/1945 | Mestas | 33/178 E |
| 2,385,157 | 9/1945 | Nilsson et al. | 33/178 R |
| 3,732,624 | 5/1973 | Eisele | 33/543 |

FOREIGN PATENT DOCUMENTS 884111  7/1953  Fed. Rep. of Germany .... 33/178 E

Primary Examiner—Harry N. Haroian
Attorney, Agent, or Firm—Krass & Young

[57] ABSTRACT

A self-centering bore hole gage includes a pair of centering points disposed on a guide block and a contact point and transducer disposed on a support block. The blocks are maintained in a biased apart relationship. The combination of biased apart blocks, points and transducer effectively self-center the gage in a bore hole so as to permit diameter and/or eccentricity measurements to be readily made by the transducer. The self-centering bore hole gage may include a plurality of measuring heads to simultaneously measure various ranges of diameter.

3 Claims, 3 Drawing Sheets

SELF-CENTERING BORE HOLE GAGE

FIELD OF THE INVENTION

This invention relates generally to measuring devices and particularly to a gage for measuring the internal diameter of a bore hole and most particularly to a bore hole gage which is self-centering.

BACKGROUND OF THE INVENTION

Measuring operations are essential in any machining or other manufacturing process; and, with the growing demand for high precision parts and the concomitant increase in high precision manufacturing techniques, the need for precise measurement is ever increasing. In many machining, manufacturing or maintenance procedures it is necessary to measure the interior diameter of a pipe, tube or bore hole. Such measurements are made for purposes of quality control in the manufacture of new items as well as for purposes of inspecting items in service to detect wear, eccentricity, and to ascertain size.

As used herein, the term "bore hole gaging" shall refer to any measurement of the interior diameter of a workpiece, be it an internal diameter formed by boring, or other machining process as well as an internal diameter formed by casting, extruding, or other such techniques.

The simplest of bore hole measuring techniques involve mechanical operations utilizing tools such as calipers. In more sophisticated variations of this technique, mechanical measuring devices may be equipped with indicating means such as an electronic transducer to provide a quicker and more accurate reading. One such apparatus is shown in U.S. Pat. No. 4,473,956. Problems occur with strictly mechanical measuring devices because of the inherent unreliability and inaccuracy of devices comprised of many moving parts and various mechanical linkages. Additionally, mechanical indicating devices are generally complicated and slow to use.

It will therefore be appreciated that there is a need for accurate, high speed, reliable bore hole gaging devices, particularly devices adapted to interface with electronic data processing systems. At present there are available a number of electronic sensors or transducers capable of providing fast and accurate readings in an output format readily compatible with electronic signal processing. It has previously been proposed to incorporate such sensor technology into bore hole gaging apparatus as will be noted in U.S. Pat. Nos. 4,030,206; 4,420,889; and 4,386,462. While the aforedescribed apparatus do provide for electronic bore hole gaging, none of the foregoing includes means for accurately centering the gage in the bore hole being measured. While accurate readings may be provided by electronic sensors, if such sensors are not precisely positioned along the diameter of the bore hole, an inaccurate reading will result. Furthermore, all of the aforementioned apparatus include 2 "live" measuring centers, that is two sensors directly coupled to a transducer. It is believed that greater accuracy would ensue if only a single live center were employed in conjunction with a relatively immobile or fixed reference measuring point.

The present invention provides for an improved bore hole gaging apparatus which is designed to be self-centering. The apparatus of the present invention is ideally suited for automated measuring of bore hole size because of the inclusion of this self-centering feature. Additionally, the gage of the present invention includes a single live measuring point, thereby increasing its accuracy and reliability. These and other advantages of the present invention will be readily apparent from the drawings, discussion and description which follow.

BRIEF DESCRIPTION OF THE INVENTION

There is disclosed herein a self-centering bore hole gage which includes a support block having a curved surface configured to correspond to a portion of the interior circumference of the bore hole. The support block includes a contact point disposed on the curved surface and adapted to engage the interior circumference of the bore hole. The gage further includes a transducer affixed to the support block and including a measuring probe extensible therefrom. The probe is adapted to contact the interior circumference of the bore hole at a point diametrically opposed to the contact point on the support block. The gage further includes a guide block having at least one passage therethrough adapted to slidably retain the transducer. The guide block includes at least two centering points adapted to engage the interior circumference of the bore hole, and the gage further includes spring means associated with the support block and the guide block, adapted to maintain those blocks in biased apart relationship. In this manner, the points cooperate to center the gage in the bore hole so that the centering point and the probe are disposed along the diameter of the bore hole.

In one particular embodiment, the transducer is a linear voltage differential transformer and may include a cap member associated therewith adapted to retain the body of the transducer while allowing the probe to extend therefrom.

The support block and guide block are generally disposed in a coplanar relationship and, in particular embodiments, the device may further include a cage configured as a generally cylindrical housing having an external diameter less than the internal diameter of the bore being measured and adapted to enclose the transducer and blocks. The cage has openings therein configured so as to allow the probe and points to project radially outward therefrom to establish contact with the walls of the bore hole.

In one particular embodiment, the gage may be adapted to measure two different ranges of bore hole diameter. Such a gage will include a first section having a first cage, blocks, points, and transducer disposed so as to measure the first range of diameters and a second section having a second cage, blocks, points, and transducer coupled to the first and disposed so as to measure the second range of diameter. The first and second sections may be disposed in a vertically spaced, concentric relationship.

Figure 1:
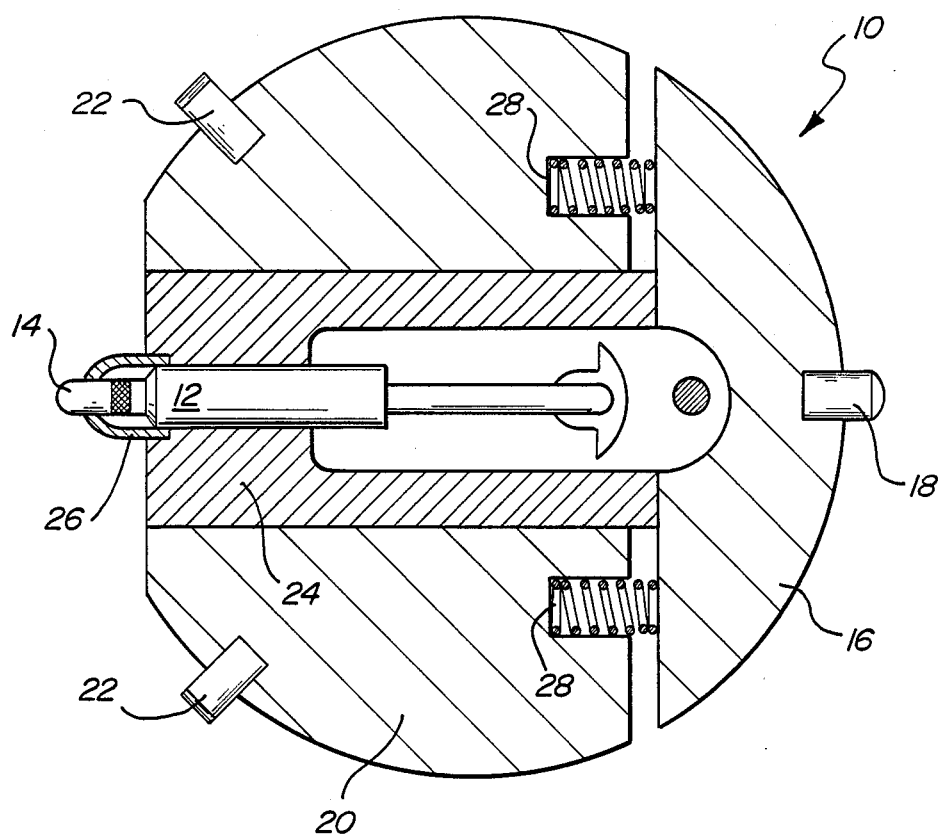
FIG. 1 is a cross-sectional view of a self-centering bore hole gage configured in accord with the principles of the present invention.

ally referred to as a linear voltage differential transformer may be readily adapted with advantage for use in the practice of the present invention. Such transducers, generally called LVDTs, comprise a pair of coils having a movable inductor disposed proximate thereto so as to form a variable transformer. It will be appreciated that the operational characteristics of the resultant transformer will depend upon the position of the moving inductor; hence, a signal applied to one coil will produce a distinct signal in the second coil depending upon the inductor position. One such LVDT which may be readily employed in the practice of the present invention is manufactured by the Sangamo Corporation and is designated as AGZ-0.5(0.1% lin.). In the illustrated embodiment, movement of the probe 14 will cause a corresponding change in the output of the transducer 12.

As illustrated, the transducer 12 is rigidly affixed to a support block 16 while the probe 14 is free to move in and out so as to actuate the LVDT. Also disposed upon the support block 16, at a point diametrically opposed to the probe 14 is a contact point 18. This point 18 is not a live contact in the sense that no electrical sensors are directly connected thereto. The point 18 is adapted to contact the wall of the bore hole and to aid in centering the probe 14 along a diameter of that bore hole. The contact point 18 may be formed as a solid body machined from, or embedded in the support block and may include a spherical or curved surface to aid in contact with the interior diameter of the bore hole, and n some instances may include a ball bearing or other low friction tip.

The bore hole gage 10 further includes a guide block 20 associated therewith. The guide block 20 includes a pair of centering points 22 permanently affixed thereto. The centering points 22 are generally similar in configuration and construction to the contact point 18 but are disposed remote therefrom and on either side of the transducer probe 14. As will be noticed, the LVDT is affixed within a cylindrical member 24 rigidly attached to the support block 16. The guide block is configured so as to allow the cylindrical member 24 and the attached transducer 12 to slide therethrough in response to motion of the support block 16. In this regard, the transducer 12 may further include an end cap 26 adapted to facilitate retention of the transducer 12 within the cylindrical member 24 while allowing the probe end thereof to radially project outward. The support block 16 and guide block 20 are maintained in spaced apart biased relationship by a pair of springs 28 associated therewith. While a wide variety of springs may be employed, compression springs sold by Uhan Brothers under the designation H-45 have been found to contact the bore hole wall. The degree of probe projection is correspondent to the diameter of the bore hole. It will readily be appreciated that the gage 10 may be rotated within the bore hole so as to measure the eccentricity of the bore hole, and such measurement is greatly facilitated by the self-centering aspects of the gage. In those instances where centering points are not included, measurements of eccentricity are very difficult to accomplish because of inability to maintain the gage in a centered relationship.

In those instances where completely automated measuring systems are employed, it is desirable to have a bore hole gage which may be readily positioned in a bore hole by mechanical manipulators such as robots and the like. The self-centering feature of the gage of the present invention thus makes it ideally suited for use in automated systems.

Figure 2:
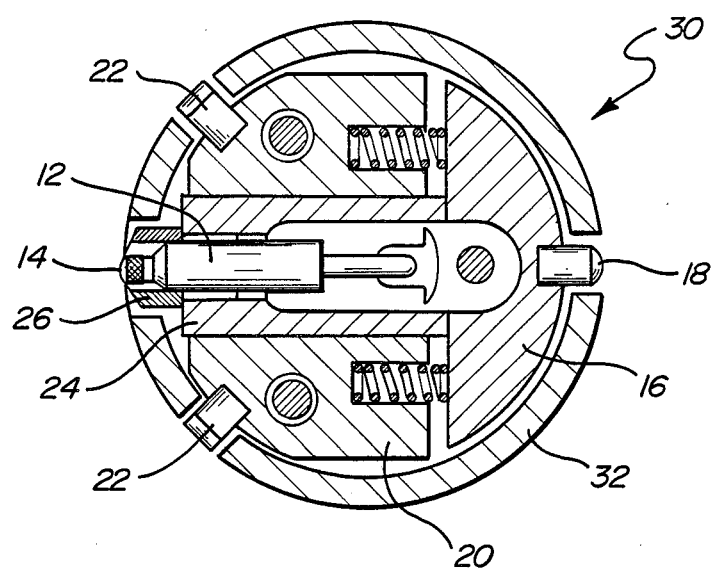
FIG. 2 is a cross-sectional view of another bore hole gage configured in accord with the principles of the present invention and including a cage associated therewith.

FIG. 2 illustrates another bore hole gage 30 structured in accord with the principles of the present invention and including a cage 32 adapted to enclose the transducer 12, support block 16, guide block 20, and cylindrical member 24. The cage 32 is a generally cylindrical body and includes a plurality of openings therein adapted to allow the contract point 18, centering points 22, and probe 14 to project radially outward therefrom.

Operation of the gage 30 including the cage 32 would generally be similar to that previously described except that the cage 32 retains the various elements therein protecting them from damage during use and allowing for ease of insertion of the gage into a bore hole. Toward this end it may be found advantageous in some instances to slightly modify the centering points 22 so as to give them a ramp-shape aspect conductive to sliding the probe into a bore hole. Such ramp-shape centering points serve to gently ease the guide block 20 and support block 16 into position when slid into a bore. Such ramp-like points are better seen in the following figures.

Figure 3:
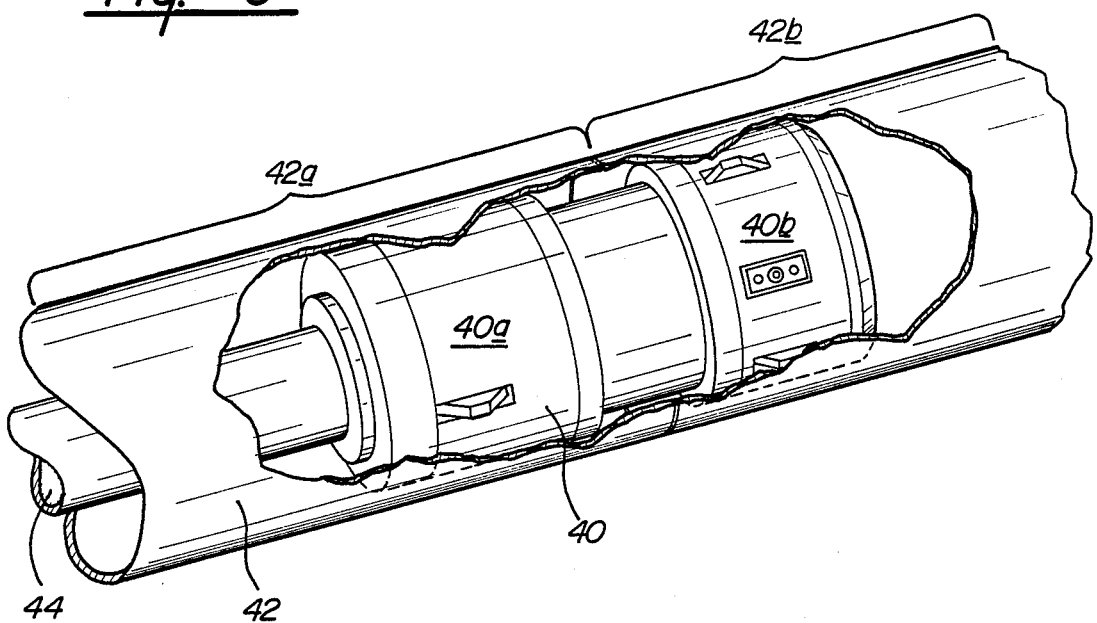
FIG. 3 is a perspective view illustrating yet another embodiment of the present invention as adapted to measure two differing diameters of bore hole.

In many instances, it is desirable to simultaneously measure a plurality of different bore hole diameters, as for example, in gaging of machined parts. Such measurements may be readily accomplished in a single step by utilizing a dual probe measuring device such as that illustrated with reference to FIGS. 3 and 4. FIG. 3 illustrates a particularly configured bore hole gage 40 as disposed to measure the interior diameter of a tube-like member 42 having a first portion 42*a* of one diameter and a second portion 42*b* of a second diameter. As illustrated, the gage 40 includes a first measuring section 40*a* adapted to measure the first diameter and a second section 40*b* adapted to measure the second diameter. As illustrated, the gage 40 is inserted into the tube 42 by means of a guiding member 44 which is a generally tubular member having sufficient rigidity to move the gage 40 within the tube 42 and providing a hollow conduit for sensor output.

Figure 4:
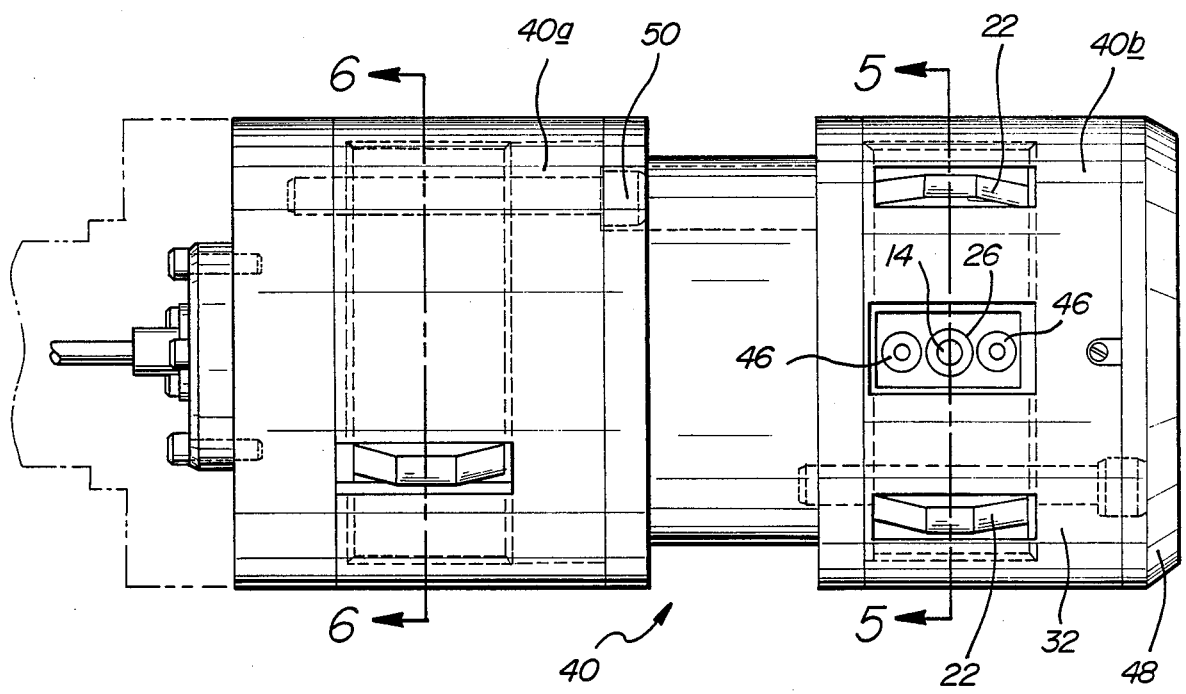
FIG. 4 is a plan view of the bore hole gage of FIG. 3.

Referring now to FIG. 4, there is shown in greater detail the gage 40 as adapted to measure dual diameters. As mentioned previously, the gage includes a first section 40a adapted to measure diameters for example, within the range of 81.940-82.030 millimeters. The gage 40 includes a second section 40b adapted for example to measure diameters in the range of 79.940-80.030 millimeters. By control of probe placement, as well as the physical dimensions of the separate units 40a, 40b, such ranges may be readily selected. While it appears from the figure that both of the sections are of the same diameter, it must be kept in mind that the outer cage or casing of the probes are generally configured to be smaller than the diameter of the bore hole. It is the contact and centering points which determine the diameters measured. A dual diameter range gage such as 40, can be used to measure a "stepped" bore hole, i.e., a bore hole having two different diameters. Alternatively, it can also be employed to measure the diameter of a bore hole having a single range of diameters in those instances where it is not known which range the bore hole falls into; in such instances, readings will be taken from the particular section of the gage responsive to the diameter of the bore hole.

FIG. 4 also clearly illustrates the ramped centering points 22, as well as the tapered front section 48 of the cage 48. Such a taper 48 facilitates insertion of the probe 40 into a bore hole. Also depicted are a pair of set screws 46 which facilitate retention of the probe cap 26.

Figure 5:
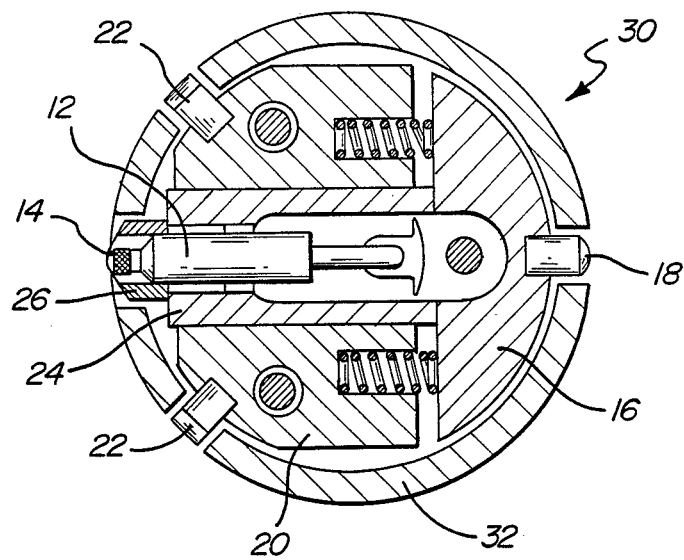

Each of the measuring sections 40a, 40b are generally similar to the gag illustrated with reference to FIG. 2 and accordingly, like features will be referred to by like reference numerals. A better understanding of the gage 40 will be had from FIG. 5 and FIG. 6 which are cross sections of the two sections 40a, 40b of the probe 40 illustrating the various components thereof. FIG. 5 is a view taken along line 5—5 of the second subunit 40b and illustrates the support block 16, guide block 20, transducer 12, contact point 18, centering points 22 and cage 32.

Figure 6:
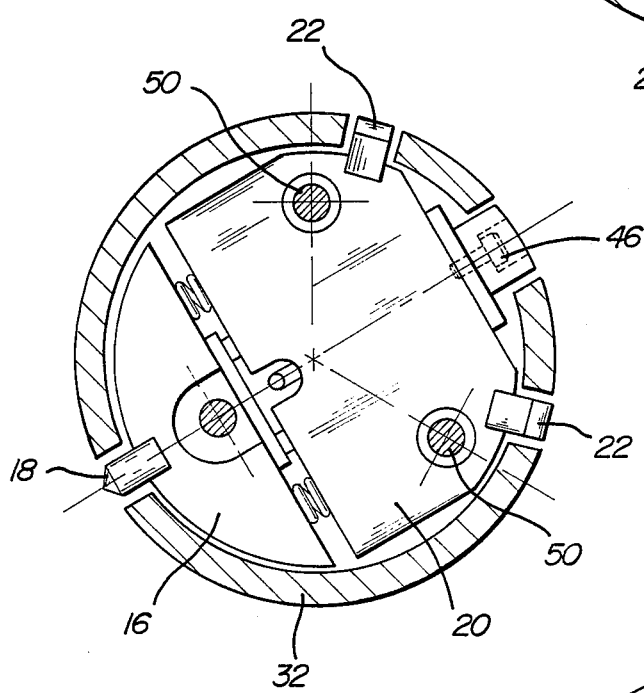

Referring now to FIG. 6, there is shown a cross-sectional view of the first measuring section 40a taken along line 6—6, at a point slightly above the level of the transducer. Visible is the cage 32, support block 16, guide block 20, centering points 22, and contact point 18. Also visible in this drawing is the mounting bracket for affixing the cap of the transducer to the apparatus and, in this regard, a mounting screw 46 is shown in phantom outline. Also visible are two mounting screws 50 which pass through the guide block 20, one of said screws also being visible in phantom outline in FIG. 4.

Figure 7:
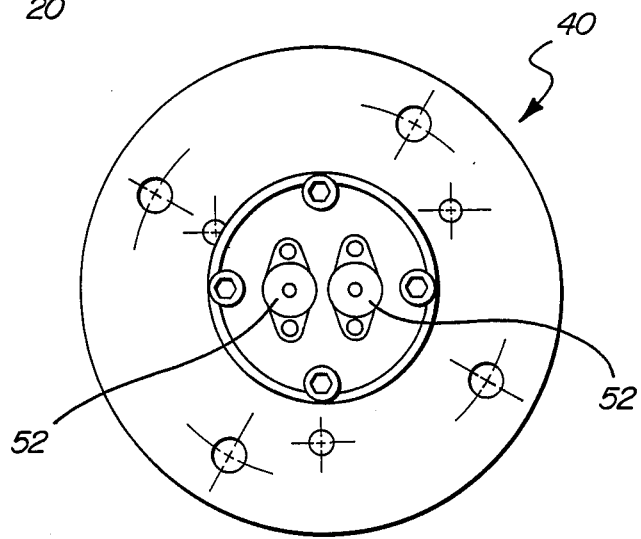

Referring now to FIG. 7, there is shown an end view of the gage 40 of FIG. 2 illustrating a pair of connectors 52 for establishing electrical contact with the transducers in the gage. These connectors are standard pin-type connectors as for example ITT Cannon microminiature connectors.

Obviously, the principles of the present invention may be extended to the fabrication of bore hole gages adapted to measure yet a larger number of different diameter ranges by the simple expedient of adding additional sections thereonto. Furthermore, it will be appreciated that while the present invention has been described with reference to the use of LVDTs, other types of positional sensors may be similarly employed. For example, linear rheostats or potentiometers may be employed in a like manner as may be optical encoders and the like. Therefore may variations of the present invention will be apparent to those of skill in the art in light of the foregoing; accordingly, the preceding discussion, description and drawings are merely meant to be illustrative of particular aspects of the present invention and not limitations thereupon. It is the following claims, including all improvements which define the scope of the invention.

I claim:

1. A self-centering bore hold gage including:
   a support block having a curved surface configured to correspond to a portion of the interior circumference of a bore hole, and including a contact point disposed on said curved surface and adapted to engage the interior circumference;
   a transducer rigidly affixed to the support block and including a measuring probe extensible therefrom and adapted to contact the interior circumference at a point diametrically opposed to the contact point;
   a guide block having at least one passage therethrough adapted to slidably retain the transducer, said guide block including at least two centering points adapted to engage the interior circumference; means configured as a generally cylindrical housing having an external diameter less than the internal diameter of the bore and adapted to enclose the transducer and blocks and having openings therein configured so as to allow said probe and points to project radially outward therefrom; and
   spring means associated with the support block and guide block and adapted to maintain said blocks in biased apart relationship, whereby said centering points cooperate to center the gage in the bore hold so that the contact point and the probe are disposed along a diameter of the bore hole.

2. A bore hole gage as in claim 1, adapted to measure two different ranges of bore hold diameters, said gage including two sections;
   the first section having a first cage, blocks, points and transducer disposed so as to measure the first range of diameters; and
   the second section having a second cage, blocks, points, and transducer disposed so as to measure the second range of diameters.

3. A device as in claim 2 wherein said first and second sections are disposed in a vertically spaced, concentric relationship.

* * * * *